US009533419B1

(12) United States Patent
Strauss et al.

(10) Patent No.: US 9,533,419 B1
(45) Date of Patent: Jan. 3, 2017

(54) ROBOTIC FINGER AND HAND

(71) Applicant: Google Inc., Mountain View, CA (US)

(72) Inventors: Marc Strauss, Mountain View, CA (US); Michael Patrick Murphy, Arlington, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/929,768

(22) Filed: Nov. 2, 2015

(51) Int. Cl.
*B25J 15/12* (2006.01)
*B25J 15/10* (2006.01)
*B25J 15/00* (2006.01)

(52) U.S. Cl.
CPC ............ *B25J 15/12* (2013.01); *B25J 15/0009* (2013.01); *B25J 15/10* (2013.01); *Y10S 901/39* (2013.01)

(58) Field of Classification Search
CPC ........... B25J 15/10; B25J 15/12; B25J 15/103; B25J 15/0009; B25J 15/0028; B25J 15/022; B25J 19/063; A61F 2/586; Y10S 901/39; Y10S 9601/49
USPC ........................................ 294/106, 198, 200
See application file for complete search history.

(56) References Cited

U.S. PATENT DOCUMENTS

| 2,545,452 | A | * | 3/1951 | Fletcher | ................... | A61F 2/586 |
| | | | | | | 623/64 |
| 4,344,729 | A | | 8/1982 | Orsinger et al. | | |
| 4,350,381 | A | * | 9/1982 | Hellmann | ............ | B25J 15/0009 |
| | | | | | | 269/266 |
| 4,673,329 | A | * | 6/1987 | Kato | ...................... | B25J 19/063 |
| | | | | | | 414/744.5 |
| 5,326,369 | A | * | 7/1994 | Schectman | ............. | A61F 2/586 |
| | | | | | | 623/24 |
| 5,762,390 | A | * | 6/1998 | Gosselin | ................ | B25J 15/103 |
| | | | | | | 294/106 |
| 6,260,902 | B1 | * | 7/2001 | Synnelius | ............ | B25J 15/0206 |
| | | | | | | 294/106 |
| 8,333,417 | B2 | * | 12/2012 | Bannasch | .......... | A61B 17/0206 |
| | | | | | | 294/100 |
| 2010/0156125 | A1 | * | 6/2010 | Lee | ...................... | B25J 15/0009 |
| | | | | | | 294/192 |

(Continued)

FOREIGN PATENT DOCUMENTS

EP          2 735 409         * 5/2014

OTHER PUBLICATIONS

Festo MultiChoiceGripper, https://www.festo.com/net/SupportPortal/Files/333986/Festo_MultiChoiceGripper_en.pdf, 2014, 6 pages.

*Primary Examiner* — Dean Kramer
(74) *Attorney, Agent, or Firm* — McDonnell Boehnen Hulbert & Berghoff LLP

(57) ABSTRACT

A robotic finger is provided. The robotic finger includes a first member that has a plurality of rigid sections that are rotatably connected end-to-end through respective first joints. The robotic finger also includes a second member that has a plurality of flexible sections that are connected end-to-end at respective second joints. The robotic finger also includes a plurality of linkages connecting the first member and the second member so as to align the plurality of flexible sections with the plurality of rigid sections side-by-side, and a respective linkage connects a respective first joint of the first member to a respective second joint of the second member. The robotic finger further includes a fingertip section that connects a distal end the first member to a distal end of the second member.

20 Claims, 11 Drawing Sheets

(56) References Cited

U.S. PATENT DOCUMENTS

| | | | |
|---|---|---|---|
| 2012/0025553 A1* | 2/2012 | Fischer | B25J 15/022 |
| | | | 294/198 |
| 2013/0341944 A1* | 12/2013 | Schlaich | B25J 15/10 |
| | | | 294/106 |
| 2014/0183891 A1* | 7/2014 | Buzby | B25B 7/12 |
| | | | 294/200 |
| 2015/0032152 A1* | 1/2015 | Frings | A61B 17/282 |
| | | | 606/207 |

* cited by examiner

ROBOTIC FINGER AND HAND

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), ingressive (such as a pin or needle), astrictive (such as a vacuum or suction element) or contigutive (requiring contact for adhesion, such as glue).

SUMMARY

The present application discloses implementations that relate to a robotic finger and a robotic hand. In one example, the present application describes a robotic finger. The robotic finger includes a first member having a plurality of rigid sections that are rotatably connected end-to-end through respective first joints. The robotic finger also includes a second member having a plurality of flexible sections that are connected end-to-end at respective second joints. The robotic finger further includes a plurality of linkages connecting the first member and the second member so as to align the plurality of flexible sections with the plurality of rigid sections side-by-side. Each respective linkage connects a respective first joint of the first member to a respective second joint of the second member. The robotic finger yet further includes a fingertip section that connects a distal end the first member to a distal end of the second member.

In some implementations, the robotic finger further includes a clutch connected to a proximal end of the first member and a proximal end of the second member. The clutch has a groove or surface with a detent. The robotic finger also includes a coupling connected to the clutch. The coupling maintains a linear relationship with the clutch when the finger is in a state of normal operation, and allows the clutch and coupling to rotate out of the linear relationship when a force applied to a side of the robotic finger is more than a threshold force.

In another example, a robotic hand includes a palm housing defining a cavity. The robotic hand also includes a plurality of hydraulic actuators positioned in cavity. The robotic hand further includes a plurality of robotic fingers coupled to the hydraulic actuators. Each robotic finger of the robotic hand includes a first member having a plurality of rigid sections that are rotatably connected end-to-end through respective first joints. Each robotic finger also includes a second member having a plurality of flexible sections that are connected end-to-end at respective second joints. Each robotic finger further includes a plurality of linkages connecting the first member and the second member so as to align the plurality of flexible sections with the plurality of rigid sections side-by-side. Each respective linkage connects a respective first joint of the first member to a respective second joint of the second member of each robotic finger. Each robotic finger further includes a fingertip section that connects a distal end the first member to a distal end of the second member.

In some implementations, each robotic finger further includes a clutch connected to a proximal end of the first member and a proximal end of the second member. The clutch has a groove or surface with a detent. Each robotic finger also includes a coupling connected to the clutch. The coupling maintains a linear relationship with the clutch when the finger is in a state of normal operation, and allows the clutch and coupling to rotate out of the linear relationship when a force applied to a side of the robotic finger is more than a threshold force.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
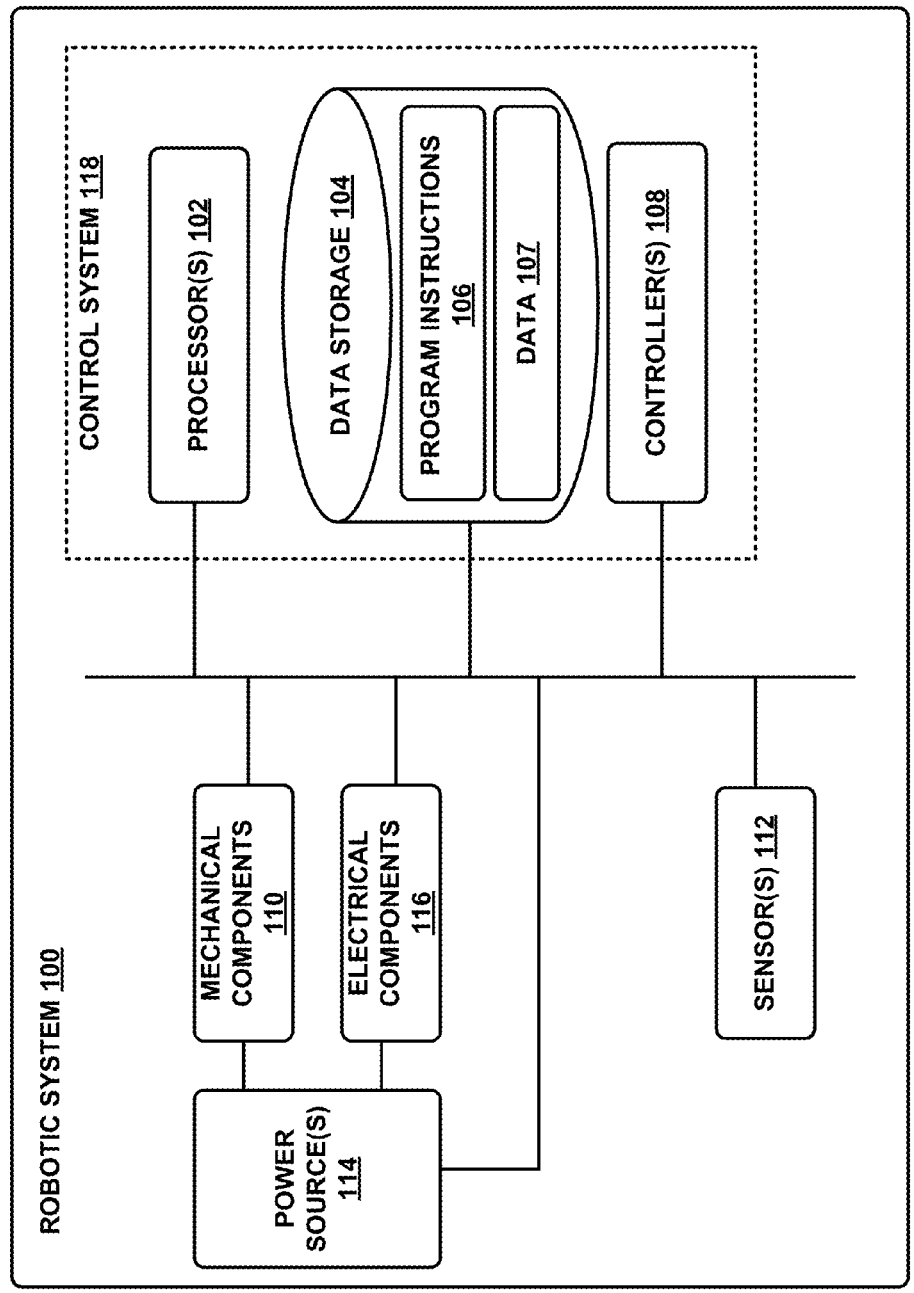
FIG. 1 illustrates a configuration of a robotic system, according to an example implementation.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. OVERVIEW

As noted above, robotic arms may include many different types of end effectors. One common type of end effector is a gripper, which allows a robotic arm to grip objects. Many grippers include two or more fingers that act to grasp an object in a pincer-like manner. Many of these types of grippers include fingers with multiple sections that are controlled by multiple motors or actuators, similar to the structure of a human finger.

Example embodiments of robotic fingers described herein may include a first member and a second member, making up a back side and a gripping side of the finger respectively. The first member may have a plurality of rigid sections, rotatably connected end-to-end through respective first joints. The rigid sections may be a hard plastic, and the joints may be pin joints, allowing the rigid sections to rotate. The second member may have a plurality of flexible sections, connected end-to-end at respective second joints. The second joints may be pin joints as well, allowing the flexible sections to rotate at the connection points. The example robotic finger may also include a plurality of linkages connecting the first member and the second member. The linkages may connect respective first joints with respective second joints, so as to align the plurality of flexible sections with the plurality of rigid sections side-by-side. In some examples, the number of rigid sections and flexible sections are the same, and the plurality of linkages connecting the respective first and second joints match up the respective sections of the first and second members. The example robotic finger may also include a fingertip section that connects a distal end the first member to a distal end of the second member. The fingertip section may include a rubber tip, allowing the fingertip section to provide the finger with added grip. The fingertip section may also include a fingernail to aid in gripping small objects.

The first and second members may include a plurality of rigid and flexible sections, respectively. In some examples, the first rigid and flexible sections connected to the fingertip section may be shorter than the second rigid and flexible sections respectively, which may be shorter than the third rigid and flexible sections, respectively. There may be a pattern in the lengths of the rigid and flexible sections such that the sections connected to the fingertip section are the shorts of the plurality, and each successive section farther from the fingertip section is increasingly longer, such that the longest rigid and flexible sections are located at the proximate end of the first and second members, respectively (i.e., the end furthest from the fingertip).

In some examples, each flexible section of the plurality of flexible sections may itself be made of a plurality of segments connected end to end. The plurality of segments may be an elastomer or flexible rubber, and arranged such that a string of segments are connected together to create each flexible section of the second member.

In other examples, the plurality of linkages connecting the first member and the second member may be rotatably connected to the first and second members. Thus, two of the plurality of rigid sections may be rotatably connected at a first respective joint, and at the same joint, rotatably connected to a linkage, while the other side of that linkage is rotatably connected to a second respective joint, that also connects two of the plurality of flexible sections. In this way, the connections between the rigid sections, flexible sections, and linkages may be such that they allow for rotational movement, yet maintain a rigid structure under certain circumstances.

In still other examples, the example robotic finger may include a clutch connected to a proximal end of the first member and a proximal end of the second member. The clutch may have a groove or surface with a detent. The example robotic finger may also have a coupling connected to the clutch. The coupling may have a member that fits into the groove, and allows the clutch to rotate with respect to the coupling. The coupling may maintain a linear relationship with the clutch when the finger is in a state of normal operation, and may allow the clutch to rotate out of the linear relationship when a force applied to a side of the robotic finger is more than a threshold force. In some examples, the coupling may include a ball-nose spring plunger, such that when the clutch and coupling are in a linear relationship, the ball fits into the detent. When a force more than the threshold force is applied to a side of the finger, the ball may move out of the detent, and allow the clutch to rotate.

Some implementations described herein may include a robotic hand, which may include one or more robotic fingers. An example robotic hand may include a palm housing that defines a cavity. The cavity may include a plurality of hydraulic actuators. The example robotic hand may also include a plurality of robotic fingers coupled to the plurality of hydraulic actuators. The plurality of robotic fingers may take the form of the example robotic finger described herein.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), and/or feet. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors to sense the position of the actuators of the robotic system. For instance, such position sensors may sense states of extension, retraction, or rotation of the actuators on arms, legs, hands, feet, or fingers.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
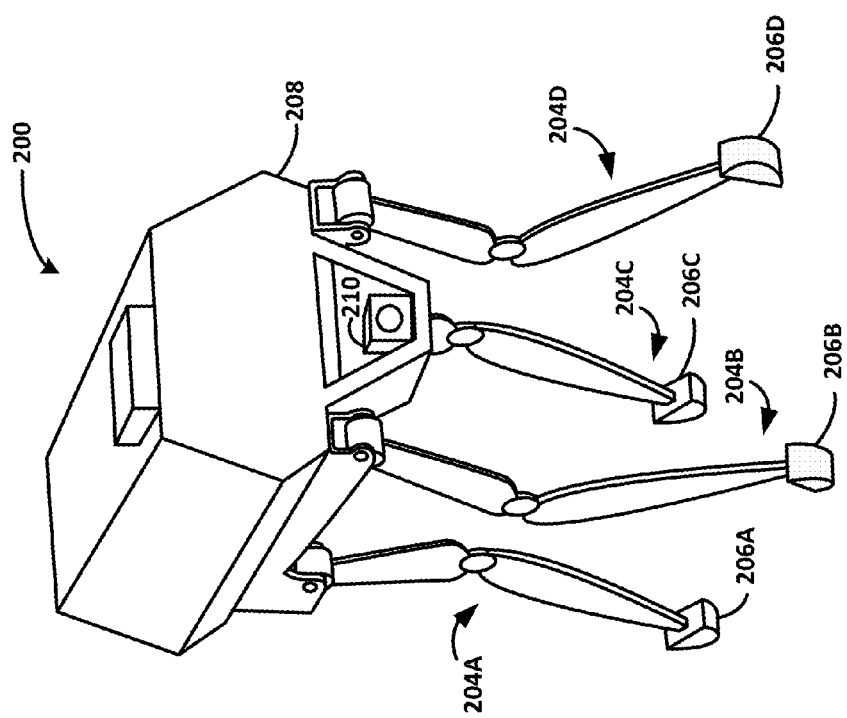
FIG. 2 illustrates a perspective view of a quadruped robot, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2. For example, in addition to legs 204A, 20BB, 204C, and 204D, quadruped robot 200 may include one or more arms, hands, and/or fingers, such as those described elsewhere in this disclosure.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D (and/or various other arms, hands, and/or fingers) may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
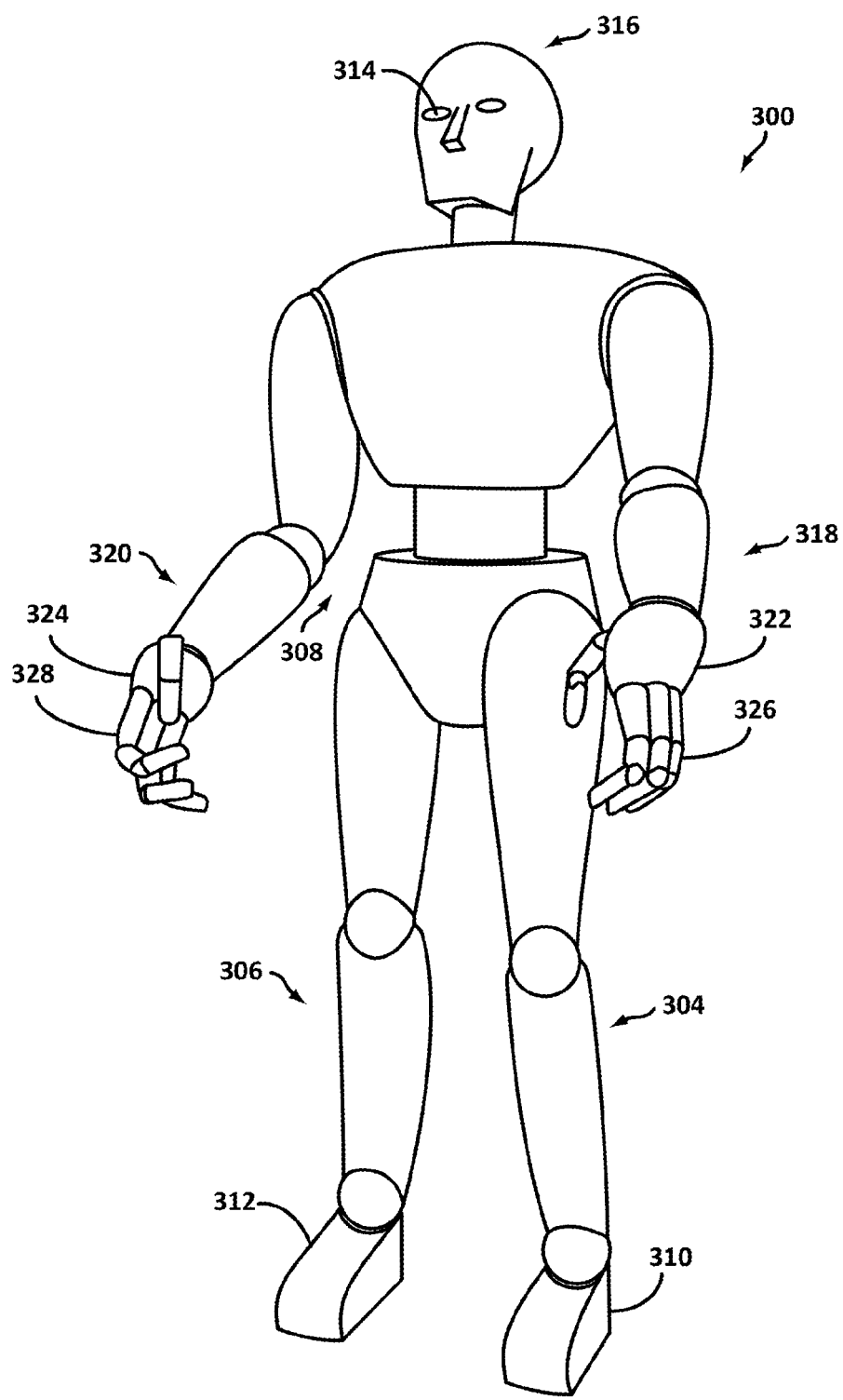
FIG. 3 illustrates a perspective view of a biped robot, according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 to facilitate gripping, turning, pulling, and/or pushing objects. The hands 322 and 324 may include various types of appendages or attachments, such as fingers, grippers, welding tools, cutting tools, and so on. For instance, hands 322 and 324 may include respective sets of fingers 326 and 328. Fingers 326 and 328 may include one or more fingers such as those described below with reference to the various other figures and embodiments.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. EXAMPLE ROBOTIC FINGER

Figure 4:
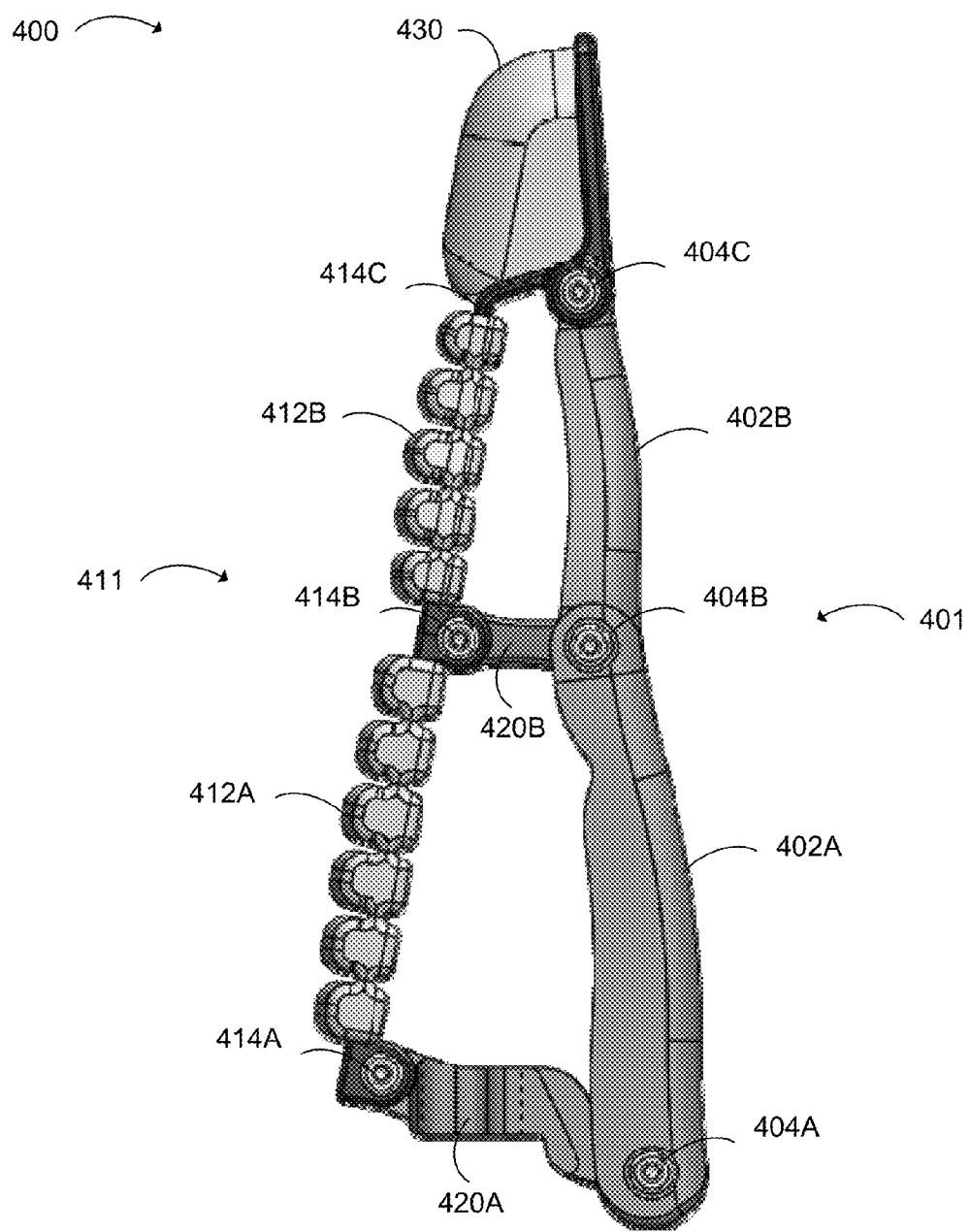
FIG. 4 illustrates an example robotic finger, according to an example implementation.

As noted above, the present disclosure includes implementations that relate to robotic fingers and/or robotic hands. FIG. 4 illustrates a robotic finger 400 according to an example implementation. Finger 400 may be implemented as a mechanical component of system 100, quadruped robot 200, and/or biped robot 300. Although the components illustrated in FIG. 4 are shown with a certain orientation and/or design, it should be understood that one or more components of robotic finger 400 may be removed, added, and/or modified while remaining within the scope of this disclosure. Also, the orientation and combination of components may be changed based on the desired implementation.

Robotic finger 400 may generally show a finger with a rigid dorsal structure and a flexible ventral structure. The flexible ventral structure may have a tread or grippable surface that runs the length of the robotic finger. Robotic finger 400 may include a first member 401 and a second member 411. Robotic finger 400 may also include a plurality of linkages 420A and 420B connecting first member 401 and second member 411, and a fingertip section 430.

First member 401 may include a plurality of rigid sections 402A and 402B. Each rigid section may be shaped in a cylindrical or rectangular prism shape. For instance, the plurality of rigid sections shown in FIG. 4 each have a top end and a bottom end that are rounded, as well as an inside and an outside. The outside of the rigid sections may be rounded, as shown in FIG. 4.

The design of each rigid section may be similar, or may vary depending on the desired implementation. Referring to the outside of the plurality of rigid sections, in some examples there may be a slight curve (see FIGS. 4-6, 8) while in other examples the outside of the plurality of rigid sections may be generally straight (see FIG. 7). Various other designs are possible as well. The specific design of the plurality of rigid sections may allow for easier and/or less expensive manufacturing, and/or may provide increased performance such as stronger grip, reduced complexity, survivability/robustness, weight reduction, or various other benefits.

In some implementations, the plurality of rigid sections may have a specific relationship to each other. For instance, where a first member 401 includes two rigid sections, the first rigid section may be connected to a fingertip section and may be shorter than the second rigid section. In another example, where a first member includes three rigid sections, the first rigid section may be connected to a fingertip section, and may be shorter than the second rigid section (i.e., a middle section), which may be shorter than the third rigid section. In this way, the first member may have multiple rigid sections, where the shortest rigid section is connected to the fingertip section, and the rigid sections become progressively longer the further they are from the fingertip.

In some implementations, each rigid section may have a cavity that allows for rigid or flexible circuitry to be included. For example, the plurality of rigid sections may include one or more pressure, positional, or tactile sensors, which may provide a control system with information about the position, orientation, and grip strength of the robotic finger. The plurality of rigid section may provide increased protection for one or more included sensors or circuits as compared to flexible sections.

In some implementations, the plurality of rigid sections may be a hard plastic or metal. In other examples, composite materials or other types of materials may be used.

First member 401 may also include a plurality of first joints 404A, 404B, and 404C. First joints 404A, 404B, and 404C may be connected to rigid sections 402A and 402B at their respective ends. For instance, rigid section 402A may include a bottom and a top, and may include first joint 404A at the bottom and first joint 404B at the top. Similarly, rigid section 402B may include a bottom and a top, and may include first joint 404B at the bottom and first joint 404C at the top. Rigid sections 402A and 402B may thus be connected end to end via first joint 404B.

In some examples, first joints 404A, 404B and 404C may be pin joints. The first joints may allow rigid sections 402A and 402B to be rotatably connected, allowing the plurality of rigid sections to form a straight line, or to move out of line and form a bend or curve. In other examples, first joints 404A, 404B, and 404C may be pivot joints, rolling joints, or circular joints. Other types of joints are possible as well.

Second member 411 of robotic finger 400 may include a plurality of flexible sections 412A and 412B. Each flexible section of the plurality of flexible sections may be shaped in a cylindrical or rectangular prism shape. For instance, each of the plurality of flexible sections shown in FIG. 4 has a top end and a bottom end, as well as an inside and an outside, and has an elongated shape. The top and bottom of each of the plurality of flexible sections may include respective second joints. In some examples, the plurality of flexible section may be connected end-to-end at respective second joints. The outside of the plurality of flexible sections may be configured to grip an object. As such, in some examples the flexible section may be an elastomer, rubber, plastic, or over molded polyurethane. Each flexible section may be configured such that it deforms when pressure is applied, and returns to an initial state when the pressure is removed. As such, no return spring or return force other than the structure of the flexible section may be needed to return the flexible section to an initial state.

The design of each flexible section may be the same, or may vary depending on the desired implementation. In some examples, each flexible section may be straight when in an initial state (see FIGS. 4-8) while in other examples, each flexible section may be curved or bent. Various other designs are possible as well. The specific design of the plurality of flexible sections may allow for easier and/or less expensive manufacturing, and/or may provide increased performance such as a stronger grip, reduced complexity, reduced slippage of an object in the finger's grasp, increased points of contact with an object, and/or other benefits.

In some implementations, the plurality of flexible sections may have a specific relationship to each other. For instance, where a second member 411 includes two flexible sections, the first flexible section may be connected to a fingertip section and may be shorter than the second flexible section. In another example, where a second member includes three flexible sections, the first flexible section may be connected to a fingertip section, and may be shorter than the second flexible section (i.e., a middle section), which may be shorter than the third flexible section. In this way, the second member may have multiple flexible sections, where the shortest flexible section is connected to the fingertip section, and the flexible sections become progressively longer the further they are from the fingertip.

In some implementations, each flexible section may have a cavity that allows for rigid or flexible circuitry to be included. For example, the plurality of flexible sections may include one or more pressure, positional, or tactile sensors, which may provide a control system with information about the position, orientation, and grip strength of the robotic finger. In other implementations, flexible circuitry may be included on an outside or gripping side of one or more flexible sections of the plurality of flexible sections.

In some implementations, the plurality of flexible sections may be made from elastomer, rubber, or another flexible material, such that each flexible section may be able to deform from an initial state. In other examples, composite materials or other types of materials may be used.

In some examples, each of the plurality of flexible sections 412A and 412B may have a design or structure that allows the flexible section to bend, twist, deform, curve, or otherwise change its shape. For instance, a flexible section may include an accordion design such that it can expand and contract along an axis that connects the flexible section end-to-end with one or more other flexible sections. In other examples, a flexible section may include a plurality of segments. The plurality of segments may be shaped like teeth, and each segment may have one or more bend points. The plurality of segments may be connected end-to-end to form a flexible section. In some examples, the plurality of segments may be rounded, and/or may be shaped to grip an object.

In some examples, the plurality of flexible sections and/or plurality of segments of a flexible section may be made of an elastomer, rubber, foam, or another material. The plurality of segments may be connected end-to-end via a midpoint or central portion of each segment, and may include a small gap between each segment such that plurality of segments combined into the flexible section can bend into a curved shaped when pressure is applied to the flexible section. In some examples, the plurality of segments may be configured such that they bend into a curve when pressure is applied only along the plane including the finger. As such, the plurality of segments may maintain a linear relationship, and/or may not deform when a pressure applied to a side of the plurality of segments. The plurality of segment may be configured to only bend in a single plane.

Second member 411 may also include a plurality of second joints 414A, 414B, and 414C. Second joints 414A, 414B, and 414C may be connected to flexible sections 412A and 412B at their respective ends. For instance, flexible section 412A may include a bottom and a top, and may include second joint 414A at the bottom and second joint 414B at the top. Similarly, flexible section 412B may include a bottom and a top, and may include second joint 414B at the bottom and first joint 414C at the top. Flexible sections 412A and 412B may thus be connected end to end via second joint 414B. In other embodiments, flexible sections 412A and 412B may be connected end-to-end independently from second joint 414B (i.e., via a static joint forming a single flexible piece), and second joint 414B may be connected to the single flexible piece at the point where flexible section 412A connects to flexible section 412B (i.e., at the static joint).

In some examples, second joints 414A and 414B may be pin joints, as shown in FIG. 4. The second joints may allow flexible sections 412A and 412B to be rotatably connected, allowing the plurality of flexible sections to form a straight line or to move out of line and form a bend or curve. In other examples, second joints 414A and 414B may be pivot joints or circular joints. Also shown in FIG. 4, second joint 414C may include a static joint connecting flexible section 412B and fingertip section 430, such that flexible section 412B does not rotate with respect to fingertip section 430. Flexible section 412B and fingertip section 430 may thus maintain a linear relationship. Other types of joints are possible as well.

Robotic finger 400 in FIG. 4 may also include a plurality of linkages 420A and 420B. Linkages 420A and 420B may connect first member 401 to second member 411 so as to align the plurality of rigid sections with the plurality of flexible sections side-by-side. The linkages may align the plurality of rigid sections with the plurality of flexible sections such that a first respective rigid and flexible section are nearly parallel to each other, and a second respective rigid and flexible section are nearly parallel to each other, as shown in FIG. 4 with reference to rigid sections 402A and 402B, and flexible sections 412A and 412B. Each of the plurality of linkages may be rectangular in shape, and/or may have one or more bends, curves, notches, or other structural characteristics. The plurality of linkages may be the same material as the plurality of rigid sections (i.e., a hard plastic, metal, or other material) or may be any other type of material.

In some implementations, linkages 420A and 420B may include respective gripping sides and back sides, with joints on each side. The back side of a respective linkage may include a respective first joint, and the gripping side of a respective linkage may include a respective second joint. Shown in FIG. 4, linkage 420A includes first joint 404A on the back side, and includes second joint 414A on the gripping side. Similarly, linkage 420B includes first joint 404B on the back side and second joint 414B on the gripping side. In this manner, the plurality of linkages connect respective first and second joints of the first member and second member, such that the plurality of rigid sections and flexible sections are aligned.

In some examples, the linkages may include pin joints, as shown in FIG. 4. Pin joints may allow the linkages to by rotatably connected to respective rigid sections and flexible sections. In other examples, the linkages may include static joints, rolling joints, or other types of joints. In still other examples, the linkages may include one type of joint on the gripping side, and another type of joint on the back side.

In some examples, the plurality of rigid sections and plurality of flexible sections may be aligned such that a first rigid section and a first flexible section are both connected to a fingertip section of a robotic finger, forming a nearly parallel relationship. The relationship between a respective rigid section and a respective flexible section may also form a generally trapezoidal shape, such that the top of a rigid section and top of a flexible section is closer than the bottom of the same rigid and flexible sections. A second rigid section and a second flexible section, connected end-to-end with respective first rigid section and flexible section, may also be generally parallel (or roughly trapezoidal) to each other. The respective rigid sections and flexible sections may be connected a plurality of linkages, such that the parallel (or roughly trapezoidal) relationship is maintained.

In some implementations, linkages in the plurality of linkages may be a given length based on a relationship between the plurality of linkages. For instance, a first linkage connecting the rigid and flexible sections that are connected to the fingertip section may be shorter than a linkage connecting the second rigid and flexible sections. As a result, a roughly trapezoidal alignment is formed by the plurality of rigid sections, plurality of flexible sections, and plurality of linkages.

In some implementations, the structure and orientation of the elements of the robotic finger (plurality of linkages, rigid sections, flexible sections, and fingertip section) is such that a stable initial state is formed, such as that shown in FIG. 4. This initial state may be an equilibrium, such that when the finger is forced out of the initial state by an impacting force, removing the impacting force causes the robotic finger to return to the initial state without any additional force.

Robotic finger 400 in FIG. 4 may also include a fingertip section 430. Fingertip section 430 may be connected to a distal end of first member 401 by a respective first joint 404C, and connected to a distal end of second member 411 by a respective second joint 414C. Fingertip section 430 may be rubber, or may be another material suited for gripping one or more objects. Fingertip section 430 may also include one or more sensors, such as a pressure, positional, or tactile sensor, which may provide a control system with information about the position, orientation, and grip strength of the robotic finger.

IV. EXAMPLE ROBOTIC HANDS

Figure 5:
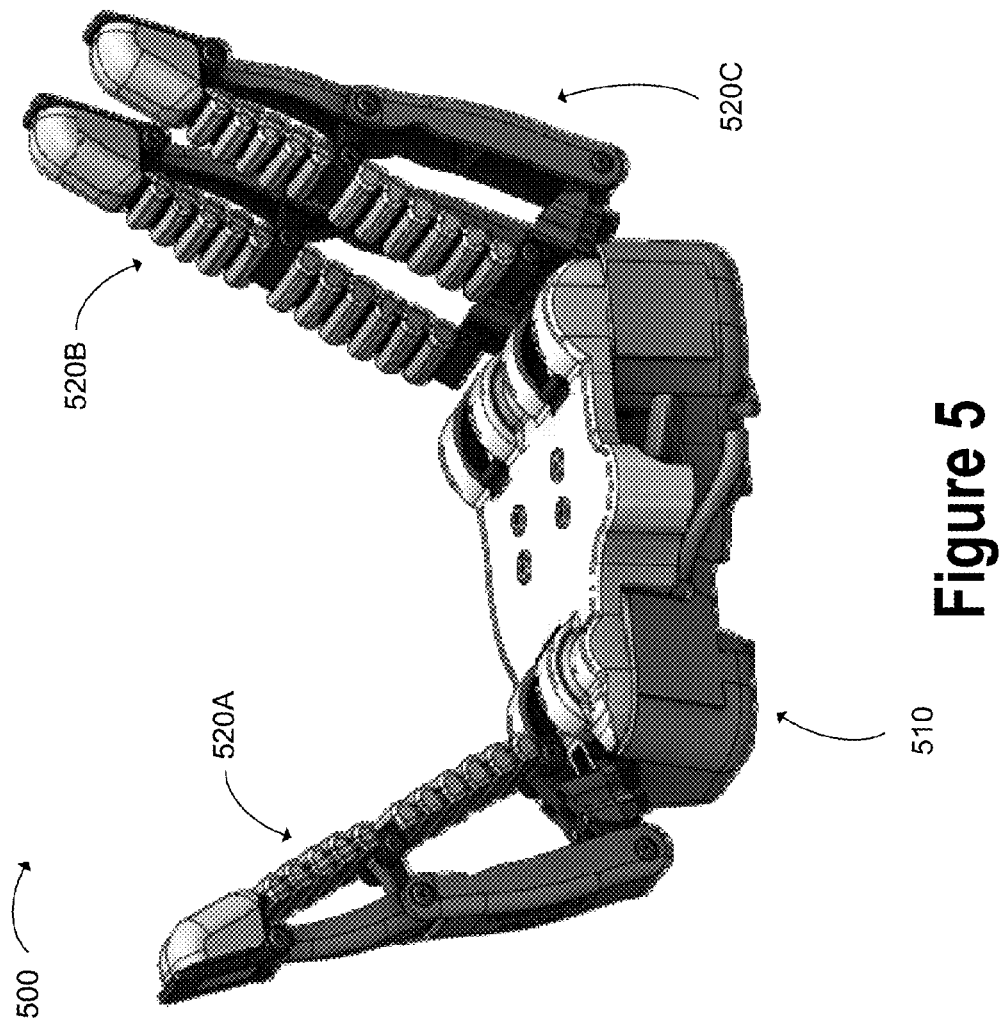
FIG. 5 illustrates an example robotic hand, according to an example implementation.

FIG. 5 illustrates an example robotic hand 500, according to an example implementation. The example robotic hand may include a palm housing 510, and a plurality of robotic fingers 520A, 520B, and 520C, which may be similar or identical to robotic finger 400. Robotic fingers 520A, 520B, and 520C may include treads or another grippable surface. In some examples, robotic hand 500 may be connected to an arm, leg, or other component of the quadruped robot 200 and/or biped robot 300, or one or more other robotic devices and/or systems. Robotic hand 500 may include three robotic fingers, as shown in FIG. 5, or may include two, four, or any other number of robotic fingers. In some examples, the robotic fingers are positioned on opposite sides of the robotic hand (as shown in FIG. 5), while in other examples the robotic fingers may be positioned evenly around the perimeter of the robotic hand, or all one side, or any other orientation. In addition, the robotic hand may take a different shape than shown.

Figure 6:
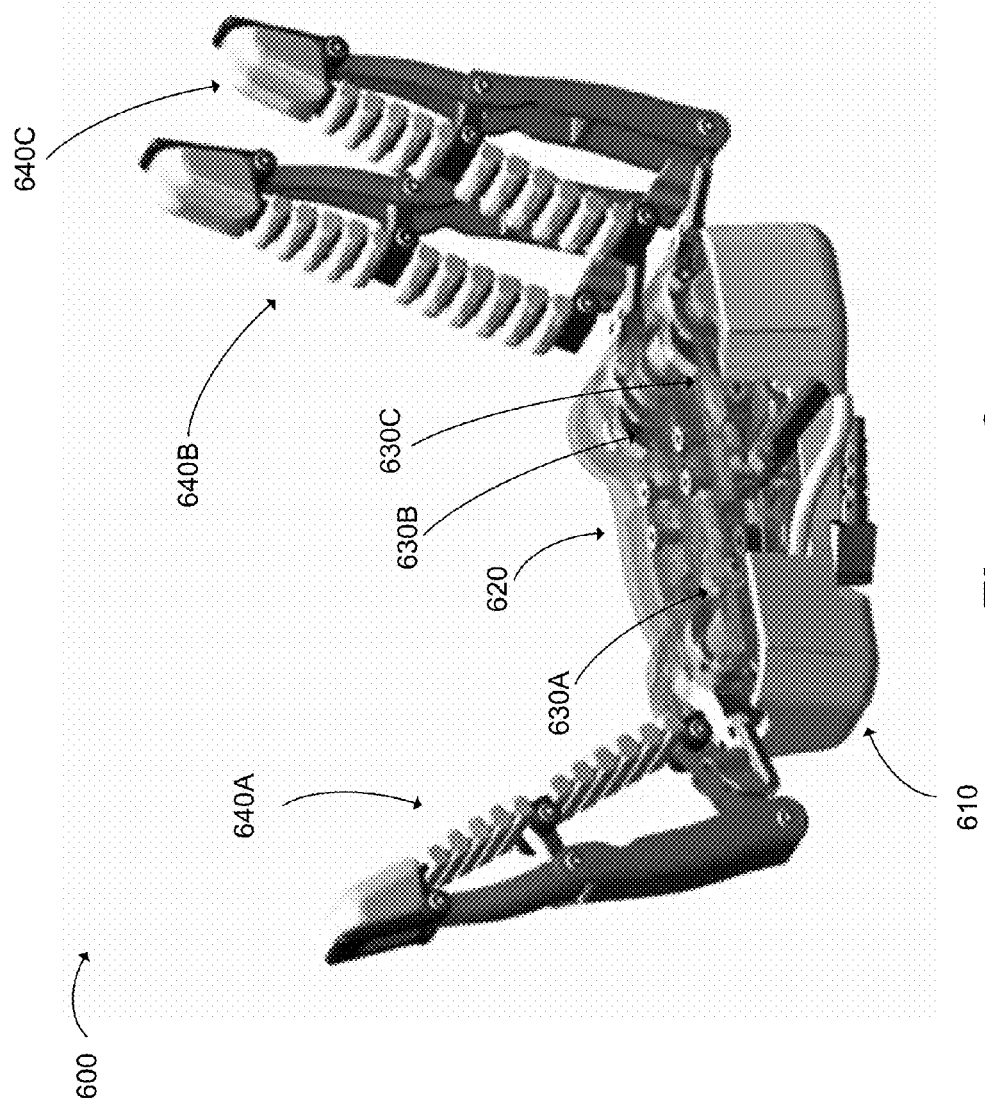
FIG. 6 illustrates an example robotic hand, according to an example implementation.

FIG. 6 illustrates an example robotic hand 600, according to an example implementation. Robotic hand 600 may include a palm housing 610, and a plurality of robotic fingers 640A, 640B, and 640C. Palm housing 610 may define a cavity 620, which may include one or more components of the robotic hand 600.

Cavity 620 may include a plurality of actuators 630A, 630B, and 630C. The plurality of actuators may function to control robotic fingers 640A, 640B, and 640C such that the robotic fingers move to grasp an object. The plurality of actuators may be hydraulic actuators, electromechanical actuators, or any other type of actuator. Each of the plurality of actuators may be aligned perpendicular to a respective robotic finger, such that the act of actuating occurs in the plane of the palm housing, and generally perpendicular to the robotic fingers as shown. In some examples the number of actuators may be the same as the number of robotic fingers. Alternatively, there may be two or more actuators that correspond to each robotic finger. Other orientations and number of hydraulic actuators are possible as well.

Figure 7:
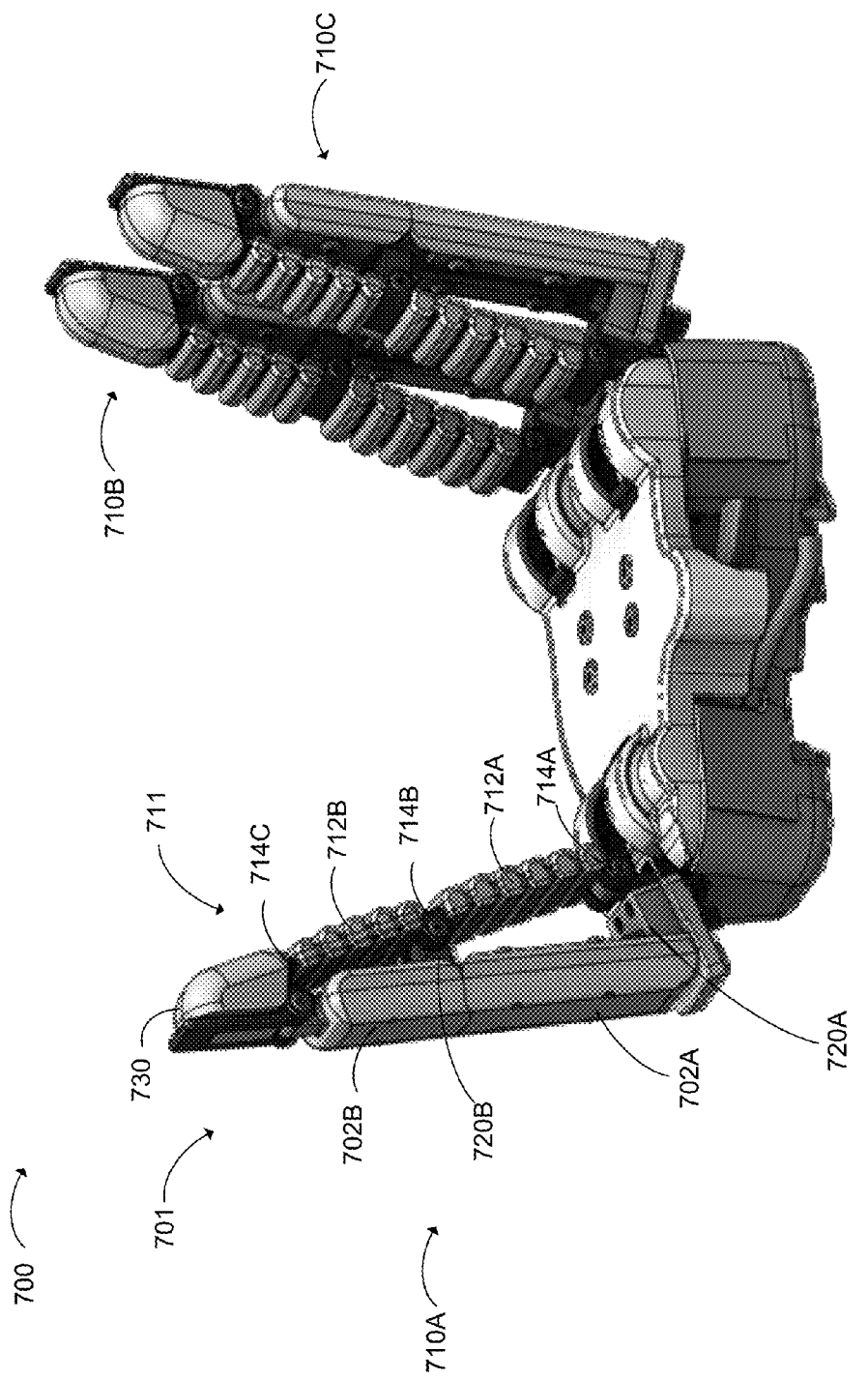
FIG. 7 illustrates an example robotic hand having example robotic fingers, according to an example implementation.

FIG. 7 illustrates an example robotic hand 700 having example robotic fingers 710A, 710B, and 710C, according to an example implementation. Robotic fingers 710A, 710B, and 710C may be similar or identical to robotic finger 400 in some respects. For instance, robotic finger 710A includes second member 711, a plurality of linkages 720A and 720B, and a fingertip section 730, which may correspond to second member 411, plurality of linkages 420A and 420B, and fingertip section 430 of robotic finger 400. Second member 711 may include a plurality of flexible sections 712A and 712B, as well as a plurality of joints 714A, 714B, and 714C, which may correspond to the plurality of flexible sections 414A and 414B, and plurality of second joints 414A, 414B, and 414C shown in FIG. 4.

Robotic finger 700 in FIG. 7 may include first member 701, which may include a plurality of rigid sections 702A and 702B. As shown in FIG. 7, the plurality of rigid sections 702A and 702B may be arranged in a straight configuration, as opposed to a slightly curved orientation of the plurality of rigid sections 402A and 402B shown in FIG. 4. Further, the plurality of rigid sections 702A and 702B may cover one or more joints (not shown) that connect the plurality of rigid sections.

In some examples, the first member 701 may include an elastomer section that runs the length of the first member 701. The elastomer section may be included in each rigid section of the first member 701, and the rigid sections 702A and 702B may act as an exoskeleton for the first member 701. In this example, the first member 701 may bend and/or twist when a side load is imparted onto the side of first member 701, while remaining stiff when a load is imparted onto the gripping side of the finger.

Figure 8:
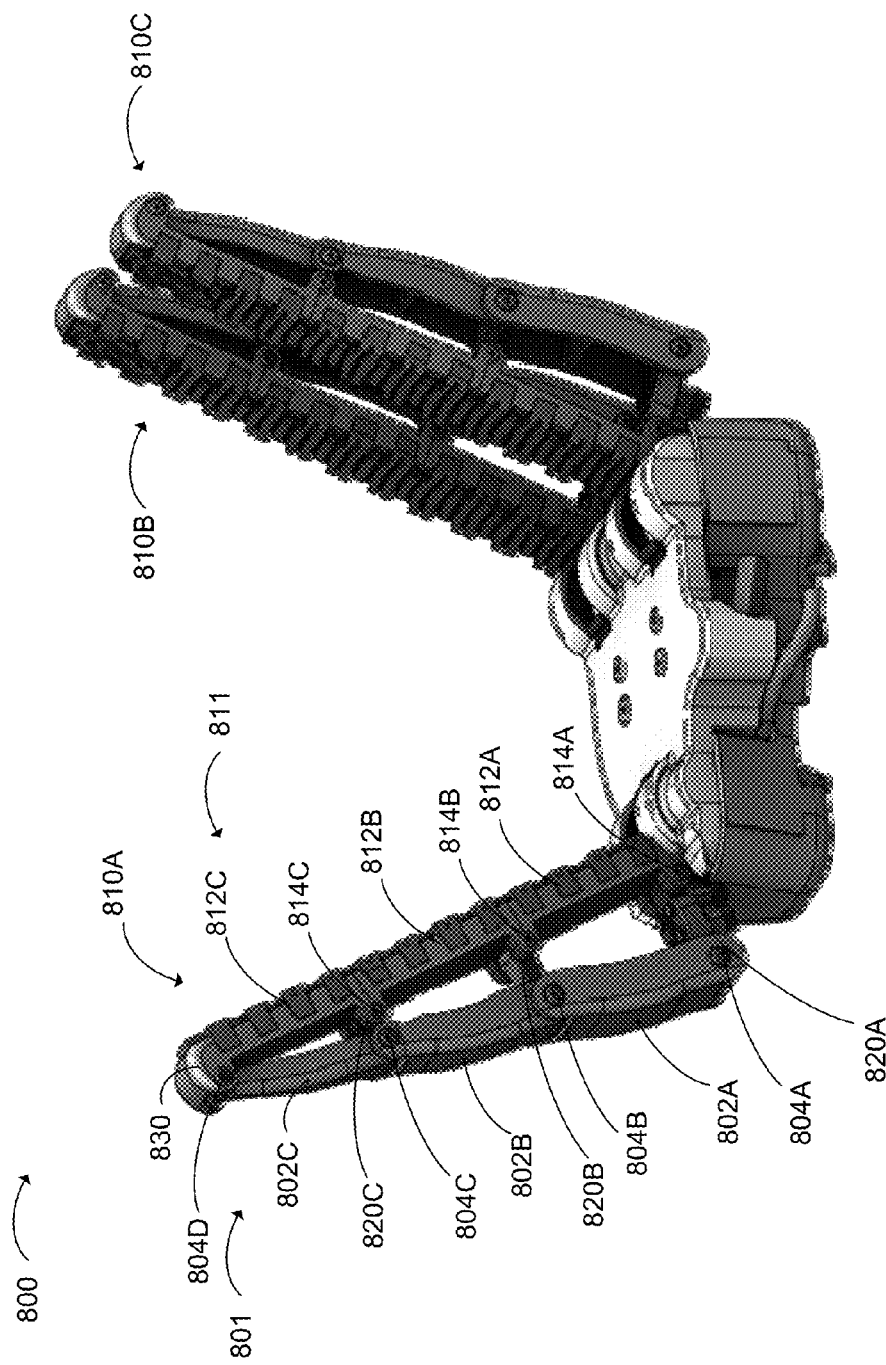
FIG. 8 illustrates an example robotic hand having example robotic fingers, according to an example implementation.

FIG. 8 illustrates an example robotic hand 800 having example robotic fingers 810A, 810B, and 810C according to an example implementation. Robotic fingers 810A, 810B, and 810C may be similar or identical to robotic finger 400 in some respects. For instance, robotic finger 810A includes first member 801, second member 811, and a plurality of linkages 820A, 820B, and 820C, which may correspond to first member 401, second member 411, and plurality of linkages 420A and 420B of robotic finger 400.

First member 801 may include a plurality of rigid sections 802A, 802B, and 802C, and a plurality of first joints 804A, 804B, 804C, and 804D, which may be similar or identical to one or more of the plurality of rigid sections 402A and 402B and plurality of first joints 404A, 404B and 404C described with reference to FIG. 4. Second member 811 may include a plurality of flexible sections 812A, 812B, and 812C, connected end-to-end by a plurality of second joints 814A, 814B, and 814C, which may be similar or identical to the plurality of flexible sections 412A and 412B, and the plurality of second joints 414A, 414B, and/or 414C.

Robotic finger 800 may differ from one or more other robotic fingers described herein in that it includes three rigid sections and three flexible sections, as opposed to two as shown in FIGS. 4-7 and described above. In addition, the plurality of flexible sections in FIG. 8 may include one or more grippable surfaces or treads that run parallel to the length of the finger. The treads may include one or more ridges and/or bumps that allow the finger to grip an object. In some cases, the plurality of flexible sections 812A, 812B and 812C may be a combination of two or more materials. For instance, flexible sections 812A, 812B, and 812C may include a first material configured to have a strong ability to grip an object, and a second material configured to bend easily and return to an initial state when a pressure is applied and removed. Other configurations are possible as well.

Further, robotic finger 810A may include a fingertip section 430 that includes rigid section 802C and flexible section 812C. In some examples, the fingertip section need not be a separate component of the robotic finger, but may be a component including parts of the first member and the second member. Fingertip section 830 may include a joint 804D, which may be similar or identical to other joints discussed herein.

V. EXAMPLE OPERATIONS

Figure 9:
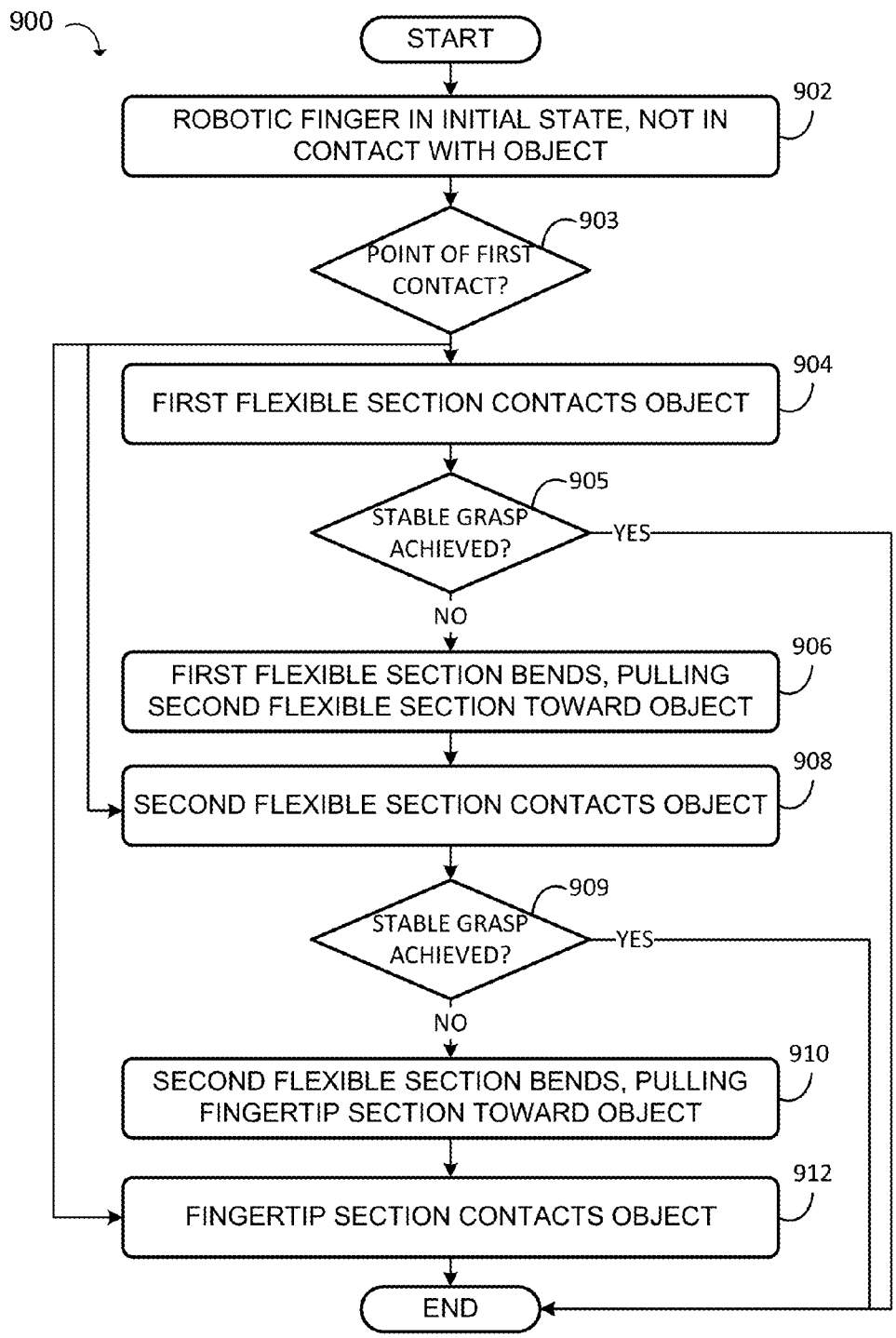
FIG. 9 illustrates a flowchart, according to an example implementation.

FIG. 9 illustrates a flowchart of an example method 900 of operating a robotic finger according to an example implementation. This example applies to a robotic finger comprising three sections, but may be applied to a finger comprising a fewer or greater number of sections. The method 900 may be applied to any of the robotic fingers or hands described in this disclosure, such as robotic finger 400, or robotic hands 500, 600, 700, and/or 800. Further, method 900 may be carried out by the robotic system 100, quadruped robot 200 and/or biped robot 300.

At block 902, method 900 may include a robotic finger in an initial state, not in contact with an object. The initial state may be a state such as those shown in and described with reference to FIGS. 4-8, or may be another initial state. In some examples, the initial state of the robotic finger includes an open orientation, such that a hand having two or more robotic fingers can attempt to grasp an object. The initial state of the robotic finger may also be a state in which the plurality of flexible sections are in a straight or nearly straight configuration.

A robotic system that includes one or more robotic fingers of this application may attempt to grasp an object using the one or more robotic fingers. As such, the robotic system may move toward an object and position the fingers such that they come into contact with the object.

At block 903, the method determines which section makes the first point of contact with the object. The method may continue with block 904, 908, or 912 depending on which section makes the first contact.

At block 904, method 900 may include a first flexible section contacting the object. In some examples the first flexible section is the flexible section furthest from the fingertip (i.e. closest to the palm). The first flexible section may initially make contact at a single point, and responsively flex, bend, or deform based on a force exerted by the object. The first flexible section may deform such that additional points of contact are made with the object. The additional points of contact may be made by the first flexible section wrapping around the object, and conforming to the shape of the object.

At block 905, the method determines whether a stable grasp of the object has been achieved. Where a stable grasp has been achieved, the method may end. However, if a stable grasp has not yet been achieved, the method may continue with block 906.

At block 906, method 900 may include the first flexible section bending and pulling a second flexible section toward the object. When the first flexible section deforms in response to the force exerted by the object, the deformation may pull the first flexible section out of its initial state by pulling a joint connecting the first flexible section toward the object. In response, the respective joint, second flexible section, and linkage connected to the first flexible section may be pulled out of the initial state as well. In effect, the first flexible section pulls the second flexible section such that it curls or wraps around the object.

At block 908, method 900 may include the second flexible section contacting the object. As a result of the pull by the first flexible section, the second flexible section curling toward the object may contact the object an initial point.

At block 909, the method determines whether a stable grasp of the object has been achieved. Where a stable grasp has been achieved, the method may end. However, if a stable grasp has not yet been achieved, the method may continue with block 910.

Then, at block 910, method 900 may include the second flexible section bending, flexing, and/or deforming, which may create additional points of contact between the second flexible section and the object. As a result of the second flexible section bending toward the object, a respective joint connecting the second flexible section and a fingertip section may be pulled toward the object. The fingertip section may also be pulled toward the object. As a result, each flexible section may have multiple points of contact with the object, which may allow for a stronger and more stable grip.

At block 912, method 900 may include the fingertip section making contact with the object. The object thus has contact with the first flexible section, the second flexible section, and the fingertip section.

In some examples, the ratio of lengths of the first and second rigid and flexible sections is such that the robotic finger has an injecting grasp. For instance, where the length of the first rigid and flexible sections is longer than the second rigid and flexible sections, contact with an object by the first flexible section and the resulting deformation as described with reference to method 900 may cause the object to be pulled inward toward the palm, as opposed to pushed out.

The effect of grasping an object with the disclosed robotic finger is that there are increased points of contact as compared to purely rigid body fingers having one or more articulable knuckles, while maintaining a strong grasp.

VI. EXAMPLE CLUTCH AND COUPLING

Figure 10A:
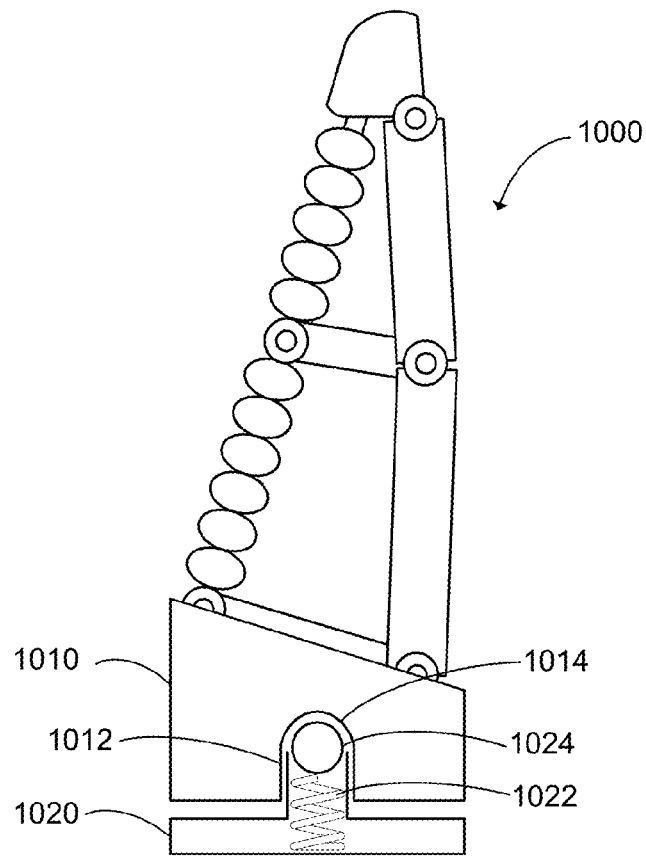
FIG. 10A illustrates a cross-sectional view of an example clutch and coupling, according to an example implementation.
Figure 10B:
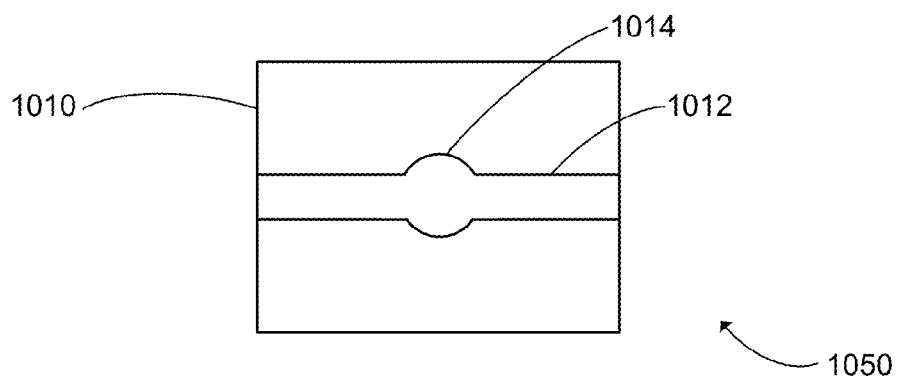
FIG. 10B illustrates a bottom view of an example clutch, according to an example implementation.
Figure 11:
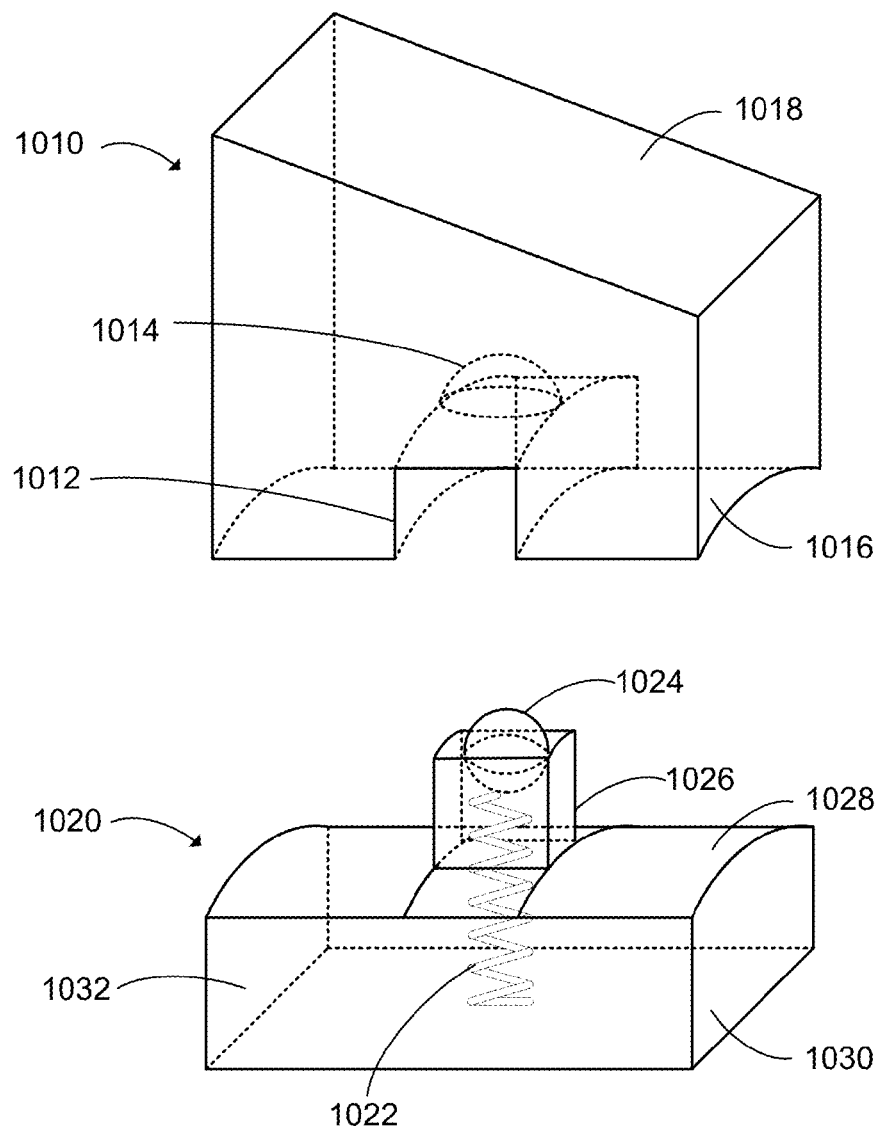
FIG. 11 illustrates a three-dimensional view of an example clutch and coupling, according to an example implementation.

FIGS. 10A, 10B, and 11 illustrate an example clutch and coupling that may be connected to the robotic finger described herein. The clutch may be connected to a proximal end of the first member and a proximal end of the second member. The clutch may include a groove or surface with a detent. The coupling may be connected to the clutch, and may have one or more components such that the coupling and the clutch maintain a linear relationship when in a state of normal operation, while allowing the clutch and coupling to rotate out of the linear relationship when a force applied to the side of the robotic finger is more than a threshold force.

FIG. 10A illustrates a cross-sectional view of an example clutch 1010 and coupling 1020, according to an example implementation. The clutch 1010 may be connected to a robotic finger 1000, which may be similar or identical to the robotic finger 400 described herein with reference to FIG. 4.

The clutch 1010 may include a groove 1012, with a detent 1014. In this example, the groove runs in a generally straight line perpendicular to a plane including the robotic finger 1000. In other examples, the groove may run in a different direction or may be oriented along a different axis. Further, the groove 1012 may have a different shape, such as a straight line, curve, bend, or any other shape. The groove 1012 may be in a central portion of the clutch 1010, as shown in FIG. 10A. In some examples, the groove 1012 may be located off-center or toward a side of the clutch.

The coupling 1020 may include one or more components that act to maintain a linear relationship between the clutch and the coupling. In the example shown in FIG. 10B, the components include a spring 1022 and a ball 1024. In other examples the coupling may include one or more pins or other elements that can be used to arrest a rotation of the coupling with respect to the clutch. The spring 1022 and ball 1024 may be positioned in or on the coupling 1020 such that the ball is pressed into the detent 1014. The ball resting in the detent may be a state of equilibrium of the clutch and coupling system, such that a force is required to move the system out of that state.

The clutch and coupling may be rotatably connected (not shown), and in addition, the spring 1022 and ball 1024 may be statically attached to the coupling such that the coupling cannot move without the ball moving. Further, the ball may be positioned such that it can roll along the groove when the clutch and coupling rotate with respect to each other.

In some implementations, there may be a force which acts upon a side of a robotic finger coupled to the clutch. Where the force is more than a threshold force, the spring may compress and the ball may move out of the detent, allowing the clutch and coupling to rotate with respect to each other. The strength of the spring, shape and size of the ball, and shape and size of the groove and detent may affect the threshold force needed to allow the clutch and coupling to rotate. In some examples, the threshold force may be defined in terms of a torque acting on the finger. For example, the force may be a force acting on the fingertip section of the finger, and the threshold may be 1 N*m (Newton-meter). In other examples, the dimensions and specifications of the components of the clutch and coupling may be selected such that a higher or lower threshold is required.

FIG. 10B illustrates a bottom view of the example clutch 1010, according to an example implementation. The clutch 1010 may include the groove 1012 and the detent 1014 as shown in FIG. 10B. In some examples, the detent 1014 may be positioned in the center of the groove 1012. This may allow the clutch and coupling to align through a central axis when the ball is in the detent. It may also allow the clutch to rotate in two directions with respect to the coupling (i.e., such that the ball can roll on either side of the detent).

FIG. 11 illustrates a three-dimensional view of the example clutch 1010 and coupling 1020, according to an example implementation.

The clutch 1010 may include the groove 1012 with the detent 1014. In addition the clutch 1010 may include a top face 1018 and a bottom face 1016. The top face 1018 may be connected to a robotic finger, such as any of the robotic fingers described in this disclosure, including robotic finger 400. The bottom face 1016 of the clutch 1010 may be curved, such that it can rotate through an axis when a force acts upon the finger and/or clutch.

The coupling 1020 may include the spring 1022 and ball 1024, as well as a top member 1026, a top face 1028, a bottom face 1030 and a side face 1032. The top member 1026 may be positioned such that it fits into the groove 1012, and allows the clutch and coupling to rotate. In some examples, the top member 1026 may match the size and shape of the groove 1012. In other examples, the top member 1026 may have a different shape and size than the groove 1012. The top member 1026 and/or groove 1012 may have a rectangular or square shape, or may be circular, ovoid, elliptical, or another shape.

The top member 1026 of the coupling 1020 may include the spring 1022 and ball 1024. The spring 1022 and ball 1024 may be oriented such that the ball rolls in the groove when the clutch and coupling rotate with respect to each other. The groove 1012 and detent 1014 may also be configured such that rotation of the clutch and coupling is arrested when the ball rolls into the detent. Further, the ball may only roll out of the detent when a force more than a threshold force is applied to a side of a finger connected to the top face 1018, or a side of the clutch 1010.

In some examples, the top face 1028 of the coupling may be curved, such that it allows the clutch and coupling to rotate smoothly. The curve in the top face 1028 of the coupling 1020 may match or correspond to a curve in the bottom face 1016 of the clutch 1010.

The coupling 1020 may also include a bottom face 1030 and a side face 1032, either of which may be connected to a palm or hand of a robotic device. As such, the clutch 1010 and coupling 1020 may together be positioned between a palm and finger of a robotic device, allowing the finger to rotate perpendicular to a normal axis of movement (i.e. perpendicular to a gripping axis) when force greater than a threshold force acts upon the finger. This may allow the robotic hand to avoid damage to the finger when a force acts upon the finger in an unanticipated or unintended direction. In some embodiments, the configuration of the clutch and coupling may be switched. In that case the coupling may be connected to the finger, and the clutch connected to the palm. The ball and spring may be included in the coupling that is connected to the finger, and the ball may roll in a grove/detent included in the clutch connected to the palm.

VII. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A robotic finger comprising:
   a first member having a plurality of rigid sections that are rotatably connected end-to-end through respective first joints, wherein each first joint connects two rigid sections such that the two rigid sections rotate about the same axis;
   a second member having a plurality of flexible sections that are connected end-to-end at respective second joints;
   a plurality of linkages connecting the first member and the second member so as to align the plurality of flexible sections with the plurality of rigid sections side-by-side, wherein a respective linkage connects a respective first joint of the first member to a respective second joint of the second member; and
   a fingertip section that connects a distal end the first member to a distal end of the second member.

2. The robotic finger of claim 1, wherein the number of rigid sections and flexible sections is the same.

3. The robotic finger of claim 1, wherein the first member having the plurality of rigid sections comprises a first rigid section and a second rigid section, wherein the first rigid section is rotatably connected to the fingertip section and is shorter than the second rigid section.

4. The robotic finger of claim 1, wherein the plurality of rigid sections are plastic.

5. The robotic finger of claim 1, wherein the second member having the plurality of flexible sections comprises a first flexible section and a second flexible section, wherein the first flexible section is connected to the fingertip section and is shorter than the second flexible section.

6. The robotic finger of claim 1, wherein the plurality of flexible sections are an elastomer.

7. The robotic finger of claim 1, wherein each of the plurality of flexible sections comprises a plurality of segments connected end-to-end.

8. The robotic finger of claim 1, wherein the plurality of linkages connecting the first member and the second member comprises:
   a plurality of rigid linkages, wherein a first end of a respective linkage is rotatably connected to the respective first joint of the first member, and a second end of the respective linkage is rotatably connected to the respective second joint of the second member.

9. The robotic finger of claim 1, wherein the plurality of linkages connecting the first member and the second member comprises:
   a first linkage connecting a proximate end of the first member to a proximate end of the second member; and
   a second linkage connecting a central part of the first member to a central part of the second member, wherein the second linkage is shorter than the first linkage.

10. The robotic finger of claim 1, further comprising:
    a clutch connected to a proximal end of the first member and a proximal end of the second member, the clutch having a groove with a detent; and
    a coupling connected to the clutch, wherein the coupling maintains a linear relationship with the clutch when the finger is in a state of normal operation, and allows the clutch and coupling to rotate out of the linear relationship when a force applied to a side of the robotic finger is more than a threshold force.

11. A robotic hand comprising:
a palm housing defining a cavity;
a plurality of hydraulic actuators positioned in cavity; and
a plurality of robotic fingers coupled to the hydraulic actuators, wherein each robotic finger comprises:
   a first member having a plurality of rigid sections that are rotatably connected end-to-end through respective first joints, wherein each first joint connects two rigid sections such that the two rigid sections rotate about the same axis;
   a second member having a plurality of flexible sections that are connected end-to-end at respective second joints;
   a plurality of linkages connecting the first member and the second member so as to align the plurality of flexible sections with the plurality of rigid sections side-by-side, wherein a respective linkage connects a respective first joint of the first member to a respective second joint of the second member; and
   a fingertip section that connects a distal end the first member to a distal end of the second member.

12. The robotic hand of claim 11, wherein the number of rigid sections and flexible sections is the same.

13. The robotic hand of claim 11, wherein the first member having the plurality of rigid sections comprises a first rigid section and a second rigid section, wherein the first rigid section is rotatably connected to the fingertip section and is shorter than the second rigid section.

14. The robotic hand of claim 11, wherein the plurality of rigid sections are plastic.

15. The robotic hand of claim 11, wherein the second member having the plurality of flexible sections comprises a first flexible section and a second flexible section, wherein the first flexible section is connected to the fingertip section and is shorter than the second flexible section.

16. The robotic hand of claim 11, wherein the plurality of flexible sections are an elastomer.

17. The robotic hand of claim 11, wherein each of the plurality of flexible sections comprises a plurality of segments connected end-to-end.

18. The robotic hand of claim 11, wherein the plurality of linkages connecting the first member and the second member comprises:
   a plurality of rigid linkages, wherein a first end of a respective linkage is rotatably connected to the respective first joint of the first member, and a second end of the respective linkage is rotatably connected to the respective second joint of the second member.

19. The robotic hand of claim 11, wherein the plurality of linkages connecting the first member and the second member comprises:
   a first linkage connecting a proximate end of the first member to a proximate end of the second member; and
   a second linkage connecting a central part of the first member to a central part of the second member, wherein the second linkage is shorter than the first linkage.

20. The robotic hand of claim 11, each robotic finger further comprising:
   a clutch connected to a proximal end of the first member and a proximal end of the second member, the clutch having a groove with a detent; and
   a coupling connected to the clutch, wherein the coupling maintains a linear relationship with the clutch when the finger is in a state of normal operation, and allows the clutch and coupling to rotate out of the linear relationship when a force applied to a side of the robotic finger is more than a threshold force.

* * * * *